United States Patent
Neubrand et al.

(10) Patent No.: US 8,758,624 B2
(45) Date of Patent: Jun. 24, 2014

(54) WATER TREATMENT PROCESS, AND MEMBRANE SEPARATION PROCESS AND WATER TREATMENT PLANT SUITABLE THEREFOR

(75) Inventors: Wolfgang Neubrand, Kulmbach (DE); Juergen Johann, Nussloch (DE); Swen Beusshausen, Steinen (DE)

(73) Assignee: P & LS Holding GmbH (AT)

( * ) Notice: Subject to any disclaimer, the term of this patent is extended or adjusted under 35 U.S.C. 154(b) by 632 days.

(21) Appl. No.: 13/126,063

(22) PCT Filed: Nov. 9, 2009

(86) PCT No.: PCT/EP2009/007981
§ 371 (c)(1),
(2), (4) Date: Jul. 14, 2011

(87) PCT Pub. No.: WO2010/054782
PCT Pub. Date: May 20, 2010

(65) Prior Publication Data
US 2011/0259824 A1    Oct. 27, 2011

(30) Foreign Application Priority Data
Nov. 11, 2008  (DE) .......................... 10 2008 057 669

(51) Int. Cl.
*B01D 15/04*     (2006.01)
*C02F 1/42*      (2006.01)
*B01D 63/12*     (2006.01)
*C02F 1/469*     (2006.01)

(52) U.S. Cl.
CPC ................ *B01D 63/12* (2013.01); *C02F 1/469* (2013.01); *C02F 1/4695* (2013.01)
USPC .......................... 210/638; 210/295; 210/321.6

(58) Field of Classification Search
CPC ............ B01D 2317/022; B01D 61/02; B01D 61/025; B01D 61/027; B01D 63/12; C02F 1/441; C02F 1/4695; C02F 2103/04; C02F 2201/003; C02F 2209/05
USPC ........................................ 210/295, 321.6, 638
See application file for complete search history.

(56) References Cited

U.S. PATENT DOCUMENTS

| 5,736,023 | A  | 4/1998 | Gallagher et al. |
| 6,929,748 | B2 | 8/2005 | Avijit et al. |

(Continued)

FOREIGN PATENT DOCUMENTS

| EP | 0 759 805 | 3/1997 |
| EP | 1 022 051 | 7/2000 |

(Continued)

*Primary Examiner* — Dirk Bass
(74) *Attorney, Agent, or Firm* — DLA Piper LLP (US)

(57) ABSTRACT

A description is given of a multistage process for treating water, wherein a water stream is purified in a membrane separation stage and a downstream deionization unit having at least one concentrate chamber and at least one diluate chamber, wherein the water stream is separated in the membrane separation device into a concentrate stream and at least two permeate streams of different electrical conductivity, and wherein at least the permeate stream having the highest electrical conductivity is fed at least partially into the at least one concentrate chamber and at least the permeate stream having the lowest electrical conductivity is fed at least partially into the at least one diluate chamber of the downstream deionization unit. In addition, a membrane separation device is described which is constructed in such a manner that at least two permeate streams having different electrical conductivity can be generated therein, and also a water treatment plant, comprising at least one such membrane separation device and at least one deionization unit having at least one concentrate chamber and at least one diluate chamber.

6 Claims, 1 Drawing Sheet

(56) References Cited

U.S. PATENT DOCUMENTS

2004/0222158 A1 11/2004 Husain et al.
2006/0144787 A1 7/2006 Schmidt et al.

FOREIGN PATENT DOCUMENTS

| WO | 00/07700 | 2/2000 |
| WO | 2004/085318 | 10/2004 |
| WO | 2005/113120 | 12/2005 |
| WO | 2008/105580 | 9/2008 |

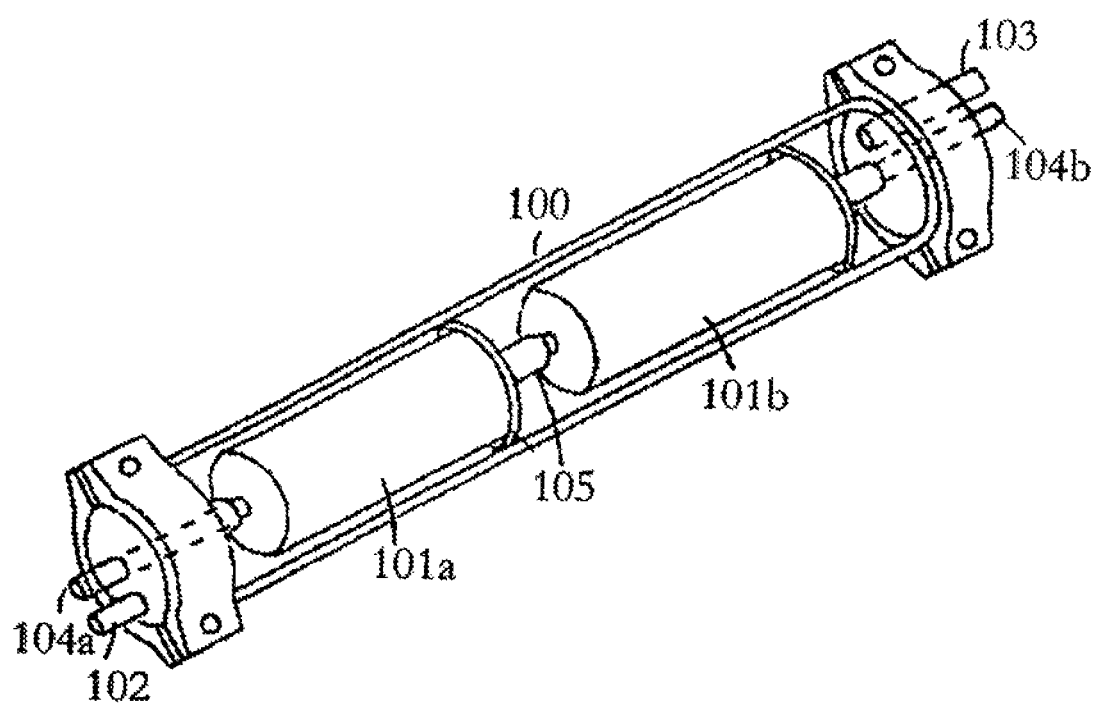

WATER TREATMENT PROCESS, AND MEMBRANE SEPARATION PROCESS AND WATER TREATMENT PLANT SUITABLE THEREFOR

RELATED APPLICATIONS

This is a §371 of International Application No. PCT/EP2009/007981, with an international filing date of Nov. 9, 2009, which is based on German Patent Application No. 10 2008 057 669.7, filed Nov. 11, 2008, the subject matter of which is incorporated by reference.

TECHNICAL FIELD

This disclosure relates to a multistage process for treating water, wherein a water stream is purified in a membrane separation stage and a downstream deionization unit having at least one concentrate chamber and at least one diluate chamber. This disclosure also relates to a membrane separation device which can be used in such a process, and a plant for treating water which is suitable for carrying out the process.

BACKGROUND

The treatment of water is currently of constantly increasing importance. In addition to drinking water, especially in the chemical and pharmaceutical industries, high-purity process waters are required which must be prepared in a large quantity as inexpensively as possible. High-purity water, in addition, is especially also required in the semiconductor industry, for example for rinsing silicon wafers, in particular after etching processes. The purity requirements of the water are known to be particularly high in this sector.

It is known that the provision of ultrapure water can be achieved with a multistage process comprising a first stage in which the raw water is softened and/or already partially desalinated, a second stage in which the water from the first stage is further purified in a pressure-driven membrane separation process, and a third stage in which the water is finally substantially completely deionized, for example by electrodeionization. In addition, further process steps, in particular for eliminating organic impurities, can be further provided.

Water softening and/or desalination in the first stage generally proceed by use of one or more ion exchangers. For the softening, cation exchangers in the sodium form are preferably used, whereas for the desalination, combinations of cation and anion exchangers are customary. The total ionic load of the water to be treated can be markedly reduced already by such methods.

Membrane separation processes which come into consideration are, in particular, reverse osmosis and nanofiltration, optionally also in combination. If relatively large amounts of dissolved carbon dioxide are present in the raw water, this process sequence can be further supplemented by a degassing step before or after the membrane separation process.

If a high water yield is of importance, the concentrate from the membrane separation stage can be treated in a further additional membrane separation stage, wherein the resultant permeate generally, owing to its high electrical conductivity, cannot be directly transferred to a deionization step. Instead, it is customarily recirculated and added upstream of the membrane separation stage to the water to be treated.

Electrodeionization devices, in customary designs, always require a solution which takes up the ions that are separated off from the water to be treated and discharges them (concentrate) from the device. This solution flows through at least one concentrate chamber, and the water to be treated through at least one diluate chamber. A high ionic conductivity in the concentrate chambers in this case is known to be achieved, in particular, by the following:

(a) an addition, e.g. of neutral salts being formed,
(b) the concentrate being recirculated through the concentrate chambers, in such a manner that the ions that are separated off accumulate there or
(c) the concentrate chambers (as also the diluate chambers) are packed with ion-exchange resins Alternatively, concentrate from an upstream membrane separation stage can also be fed into the concentrate chambers of an electrodeionization device. However, this must generally be worked up in an intermediate step, as disclosed by WO 2005/113120.

It could therefore be helpful to provide a technical solution for the multistage treatment of water, which, compared with known solutions, shall have a structure kept as simple as possible, in particular as concerns the deionization stage.

SUMMARY

We provide a multistage process for treating water including purifying a water stream in a membrane separation stage and a downstream deionization unit having at least one concentrate chamber and at least one diluate chamber, separating the water stream in the membrane separation stage into a concentrate stream and at least two permeate streams of different electrical conductivity, and feeding a) at least the permeate stream having the highest electrical conductivity at least partially into the at least one concentrate chamber and b) at least the permeate stream having the lowest electrical conductivity at least partially into the at least one diluate chamber of the downstream deionization unit.

We also provide a membrane separation for treating water constructed such that at least two permeate streams of different electrical conductivity are generated therein.

We further provide a plant for treating water including at least one membrane separation device, at least one deionization unit having at least one concentrate chamber and at least one diluate chamber.

BRIEF DESCRIPTION OF THE DRAWING

FIG. 1 shows an example of our membrane separation device.

DETAILED DESCRIPTION

The process is a multistage process for treating water, in particular for producing ultrapure water which is suitable for the applications mentioned at the outset. In the process, a water stream is purified in a membrane separation stage and a downstream deionization unit having at least one concentrate chamber and at least one diluate chamber, in particular in a corresponding electrodeionization unit.

Permeate from a membrane separation stage, depending on the feed concentration, has a varying composition. At the inlet, the salt content of the water to be treated is relatively low, for which reason the permeate also has a relatively low salt content and a relatively low electrical conductivity. However, the further from the feed within a membrane separation stage, the stronger are the salts enriched in the concentrate. As a consequence, the permeate which is produced by the membrane at this point of the membrane separation stage generally also has a higher salt content and also a higher conductivity.

We utilize this effect by feeding in low-salt permeate from one membrane separation stage on the diluate side of the membrane to a downstream deionization unit, while high-salt permeate of the concentrate side is fed to the deionization unit.

The process is correspondingly distinguished in that the water stream to be treated is separated in the membrane separation stage into a concentrate stream and two or more permeate streams of different electrical conductivity. At least the permeate stream having the highest electrical conductivity is partially or completely fed into the at least one concentrate chamber of the downstream deionization unit. At least the permeate stream having the lowest electrical conductivity is partially or completely fed into the at least one diluate chamber.

The permeate stream can be separated, for example, by contacting the water stream in the membrane separation stage with at least two membrane modules, particularly preferably with exactly two membrane modules, arranged in such a manner that they are successively subjected to incoming flow of the water to be treated. Preferably, the membrane modules each have a separate permeate discharge.

The at least two membrane modules are preferably reverse osmosis modules and/or nanofiltration modules. Suitable modules are described further hereinafter.

If, e.g., two reverse osmosis modules of the same type are arranged in such a manner that they are successively subjected to incoming flow, then the membrane module subjected to incoming flow first generally produces the permeate stream having the lowest electrical conductivity. The membrane module subjected to incoming flow last produces in this case the permeate stream having the highest electrical conductivity. The same applies in principle also to nanofiltration modules of the same type.

However, alternatively, it is also conceivable, for example, in the membrane separation stage to arrange, e.g., a nanofiltration module and a reverse osmosis module in such a manner that first the nanofiltration module and then the reverse osmosis module is subjected to incoming flow. Generally, the nanofiltration module, even if it is subjected to incoming flow first, always produces the permeate stream having the higher electrical conductivity, since it customarily does not pose a great obstacle, at least to the monovalent ions most frequently occurring, in contrast to reverse osmosis.

Correspondingly, in a combination of a nanofiltration module and a reverse osmosis module, the membrane modules can be arranged in principle in any desired sequence, in such a manner that, e.g., a reverse osmosis module is subjected to incoming flow first, and then a nanofiltration module is subjected to incoming flow.

Concentrate exiting from the deionization unit, preferably is at least partially recirculated and added back to the water stream upstream, in particular upstream of the membrane separation stage. The water yield of the overall system can thereby be increased.

Before the water stream is fed into the membrane separation stage, it is preferably partially desalinated and/or softened by at least one ion exchanger. Suitable ion exchangers are known to those skilled in the art.

Particularly preferably, the permeate stream to be fed into the at least one concentrate chamber of the deionization unit has an electrical conductivity in the range between 5 $\mu$S/cm and 500 $\mu$S/cm. Within this range, values between 10 $\mu$S/cm and 300 $\mu$S/cm, in particular approximately 100 $\mu$S/cm, are further preferred. To achieve this conductivity range, the permeate stream can optionally be concentrated or diluted (e.g. by increasing the fraction of more highly or less concentrated permeate).

The process offers in particular the following advantages:

Sufficient conductivity in the concentrate chambers of the deionization unit can be ensured even without addition of neutral salts or circulation of the concentrate. The expenditure on apparatus for these measures is dispensed with.

Permeate of low and high conductivity can be generated in the same pressure housing, and the construction of the membrane separation device to be used can therefore be kept very simple.

The latter aspect in particular will be considered further hereinafter.

A membrane separation device is suitable in particular for treating water in the above-described process. It is constructed in such a manner that at least two permeate streams having different electrical conductivity can be generated therein.

Particularly preferably, the membrane separation device has at least two membrane modules arranged in such a manner that they can be successively subjected to incoming flow of the water to be treated as already mentioned above.

Likewise, it has already been mentioned that the membrane modules can be not only nanofiltration modules but also reverse osmosis modules, optionally also combinations of both in any desired sequence.

The at least two membrane modules can be structurally separated from one another and each accommodated in separate containers, optionally, also a pump can be arranged between the membrane modules.

Particularly preferably, a membrane separation device comprises, however, two or more membrane modules arranged within a shared pressure vessel. This is preferred, in particular, when the membrane modules are reverse osmosis modules of the same type. Suitable pressure vessels are known and they are generally customary vessels for receiving membrane modules for reverse osmosis.

Particularly preferably, the pressure vessel is a simple tube in which the at least two membrane modules are arranged one behind the other in an axial direction.

Suitable membrane modules are, for example, spirally wound modules. These can have one or more membrane pockets which, together with a net-like spacer, are spirally wound around a perforated permeate collecting tube. The membrane pockets in this case preferably comprise two membranes between which the spacer mentioned is arranged. The pockets are closed on three sides and connected to the permeate collecting tube at the fourth open side. Water to be treated flows through such a module in an axial direction, while the permeate flows to the collecting tube in a spiral manner.

Particularly preferably, the at least two membrane modules of a membrane separation device each have a separate permeate outflow. Via these, the permeate streams of different electrical conductivity can then be fed to their respective destination.

A plant for treating water comprises at least one membrane separation device as has already been described above, and also at least one deionization unit, in particular at least one electro-deionization unit, having at least one concentrate chamber and at least one diluate chamber. In particular, the plant is suitable for carrying out a water treatment process.

Similarly thereto, in the at least one membrane separation device of the plant, preferably at least two membrane modules are arranged in such a manner that they can be successively subjected to incoming flow of the water to be treated. The at least two membrane modules each have a separate permeate outflow. At the same time, at least the permeate outflow of the membrane module subjected to incoming flow first is coupled to the at least one diluate chamber, and at least the permeate outflow of the membrane module subjected to incoming flow last is coupled to the at least one concentrate chamber. This can be the case, in particular, when the at least two membrane modules are either solely nanofiltration modules of preferably the same type, or solely reverse osmosis modules of preferably the same type.

Alternatively, in the at least one membrane separation device of the plant, preferably at least two membrane modules are arranged in such a manner that they can be successively subjected to incoming flow of the water to be treated, wherein the at least two membrane modules each have a separate permeate outflow.

Preferably, in particular when the at least two membrane modules are either reverse osmosis modules or nanofiltration modules in each case of the same type, the permeate outflow of the membrane module subjected to incoming flow first is coupled to the at least one diluate chamber, and the permeate outflow of the membrane module subjected to incoming flow last is coupled to the at least one concentrate chamber. Further preferably, the membrane module subjected to incoming flow first is a reverse osmosis module and the membrane module subjected to incoming flow last is a nanofiltration module.

Further preferably, the permeate outflow of the membrane module subjected to incoming flow first is coupled to the at least one concentrate chamber, and the permeate outflow of the membrane module subjected to incoming flow last is coupled to the at least one diluate chamber. This is the case, in particular, when the membrane module subjected to incoming flow first is a nanofiltration module and the membrane module subjected to incoming flow last is a reverse osmosis module.

Further features result from the description of the drawing hereinafter. The individual features can each be implemented alone, or a plurality in combination with one another can be implemented. The drawing serves merely for illustration and for better understanding, and is in no way to be taken to be restricting.

FIG. 1 shows an example of our membrane separation device. What is shown is the pressure tube 100 in which the membrane modules 101*a* and 101*b* are arranged one behind the other. Both modules are spirally wound modules. Water to be treated enters into the pressure tube 100 via the intake 102 and then the two membrane modules 101*a* and 101*b* are subjected successively to incoming flow. In the membrane module 101*a*, correspondingly permeate having a low salt content and a low electrical conductivity is generated, in the membrane module 101*b*, permeate having a higher salt content and also a higher electrical conductivity is generated. The concentrate is finally removed via the outlet 103. Each of the membrane modules 101*a* and 101*b* has a separate outflow for the permeate generated, namely outflows 104*a* and 104*b*. The component 105 in classical membrane separation devices is a connection between the permeate collecting tubes of the membrane modules. In the present case, however, this connection is blocked, ultimately mixing of the permeate obtained in the modules 101*a* and 101*b* is not wanted. This component 105 therefore functions merely as a spacer.

The invention claimed is:

1. A multistage process for treating water comprising:
purifying a water stream in a membrane separation stage and a downstream deionization unit having at least one concentrate chamber and at least one diluate chamber;
separating the water stream in the membrane separation stage with at least two spirally wound membrane modules arranged in a tubular pressure vessel, one behind the other, in an axial direction and successively subjected to incoming flow of the water to be treated into a concentrate stream and at least two permeate streams of different electrical conductivity; and
feeding a) at least the permeate stream having the highest electrical conductivity at least partially into the at least one concentrate chamber and b) at least the permeate stream having the lowest electrical conductivity at least partially into the at least one diluate chamber of the downstream deionization unit.

2. The process as claimed in claim 1, wherein the at least two membrane modules are reverse osmosis modules and/or nanofiltration modules.

3. The process as claimed in claim 1, wherein concentrate exiting from the deionization unit is at least partially recirculated and added back to the water stream upstream of the membrane separation stage.

4. The process as claimed in claim 1, wherein the water stream, before it is fed into the membrane separation stage, is partially desalinated and/or softened by at least one ion exchanger.

5. The process as claimed in claim 1, wherein the permeate stream fed into the at least one concentrate chamber of the deionization unit is adjusted to an electrical conductivity of 5 μS/cm to 500 μS/cm.

6. The process as claimed in claim 1, wherein the permeate stream fed into the at least one concentrate chamber of the deionization unit is adjusted to an electrical conductivity of 10 μS/cm to 300 μS/cm.

\* \* \* \* \*